Aug. 6, 1929.                C. N. KOCH                 1,723,515
                         COMBUSTION TURBINE
                    Filed April 11, 1923       11 Sheets-Sheet 5
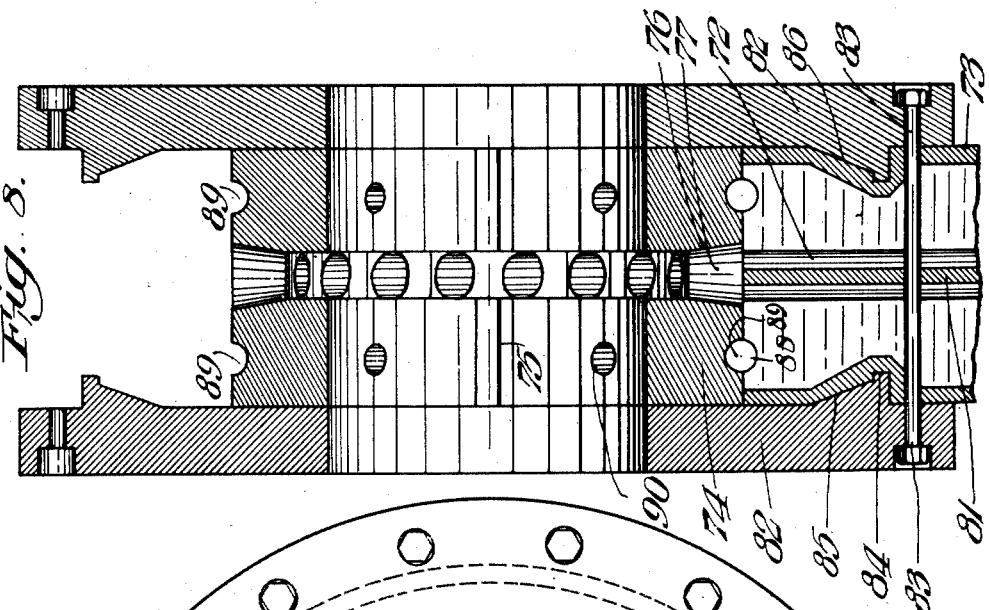
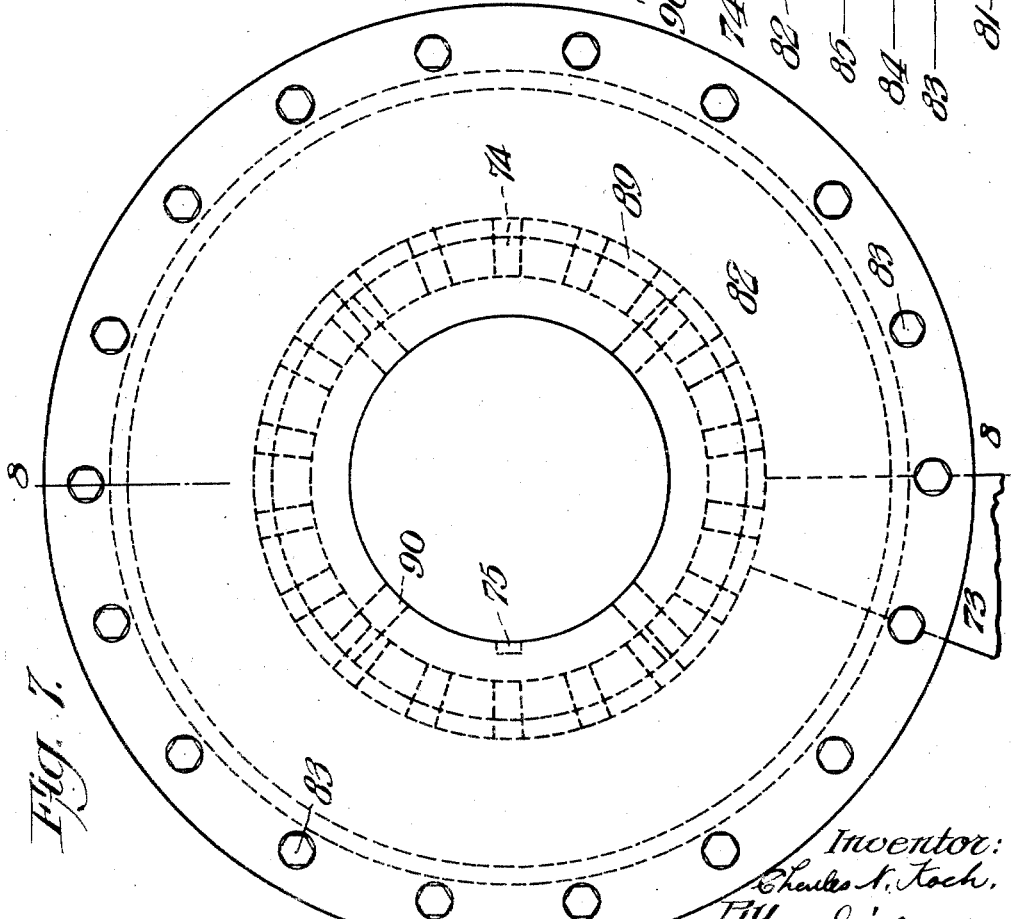

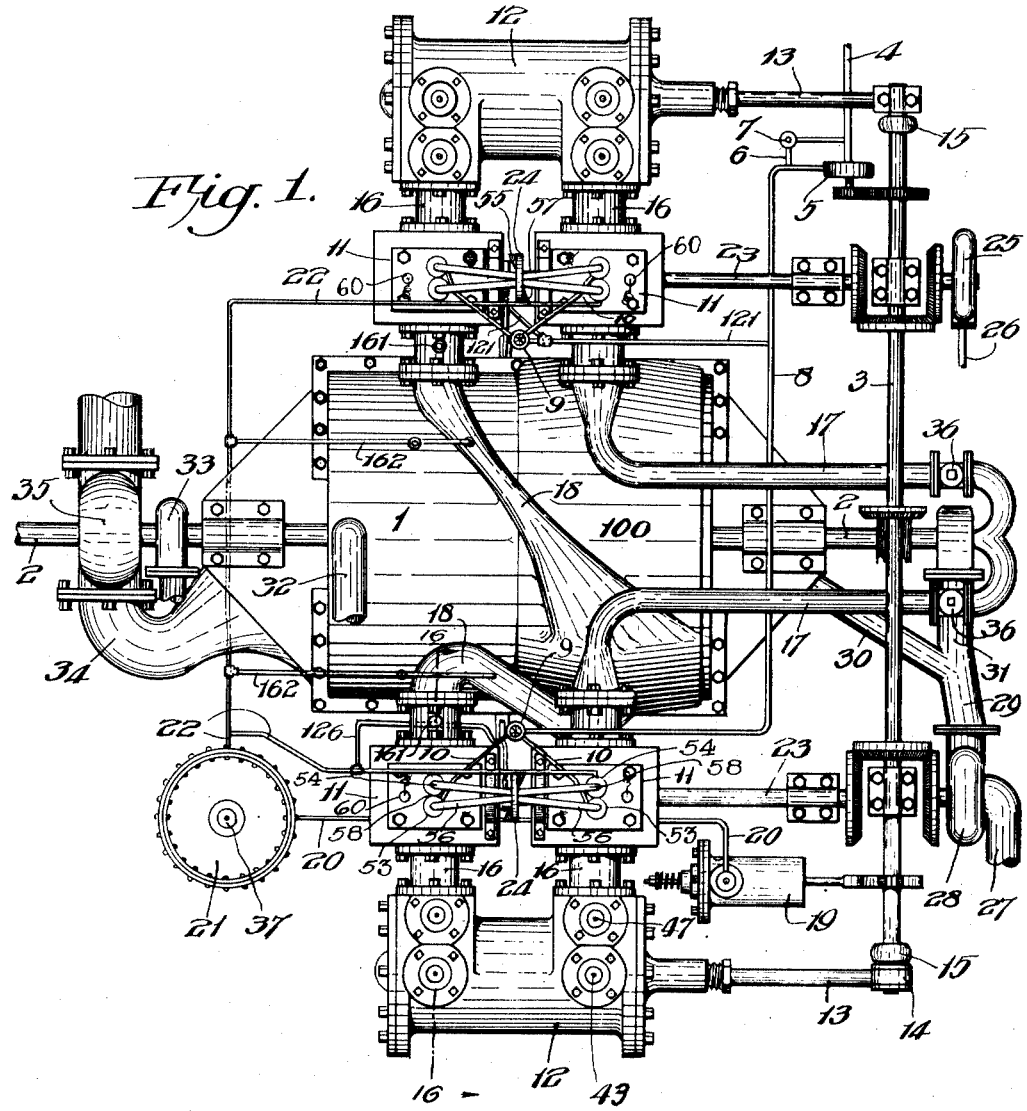

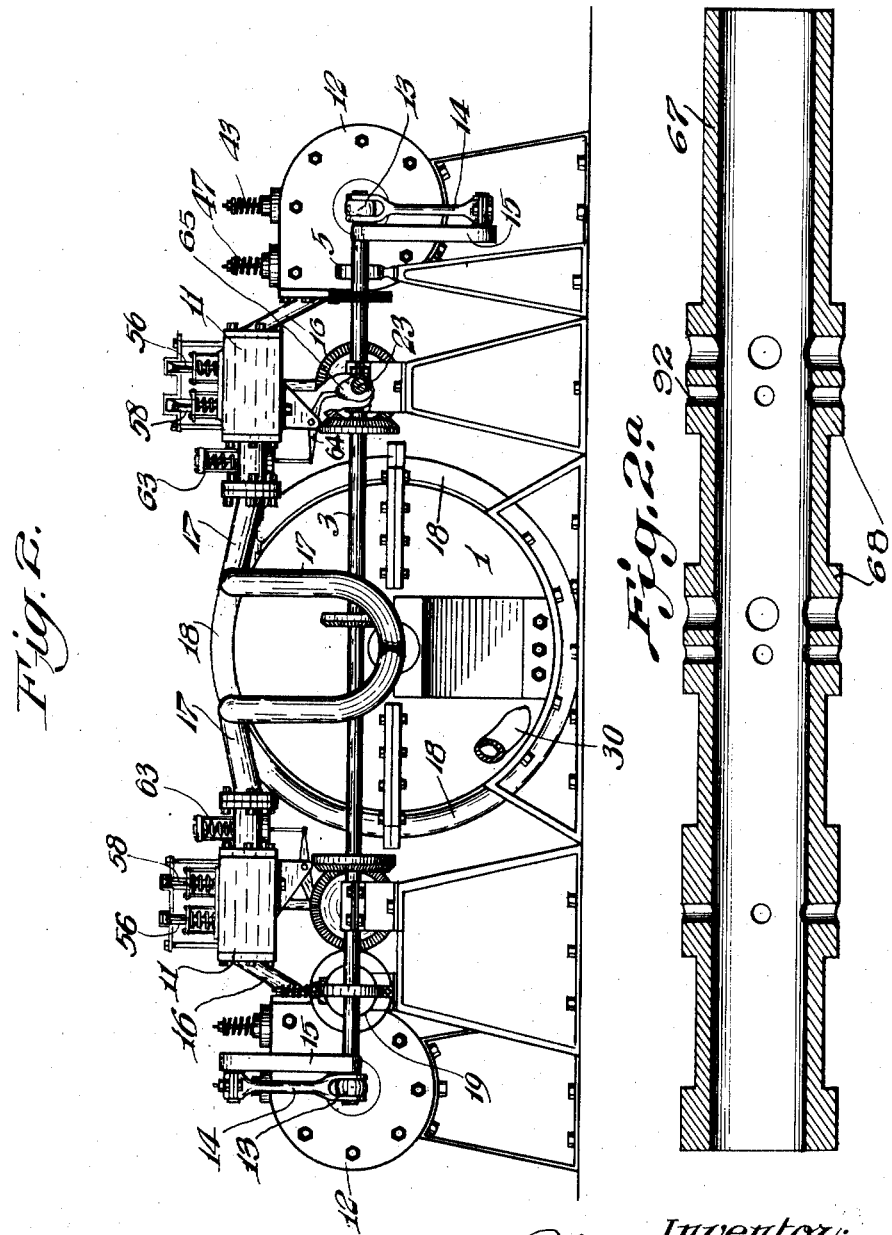

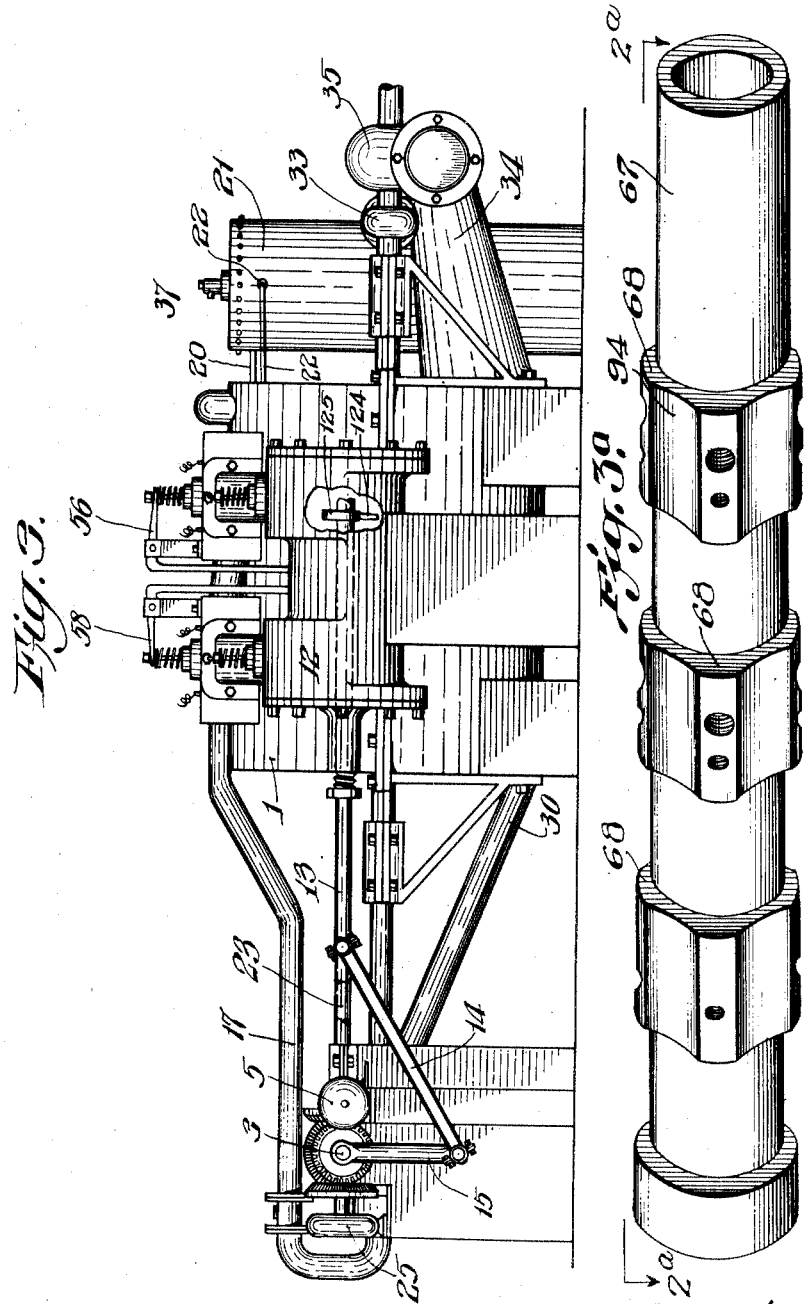

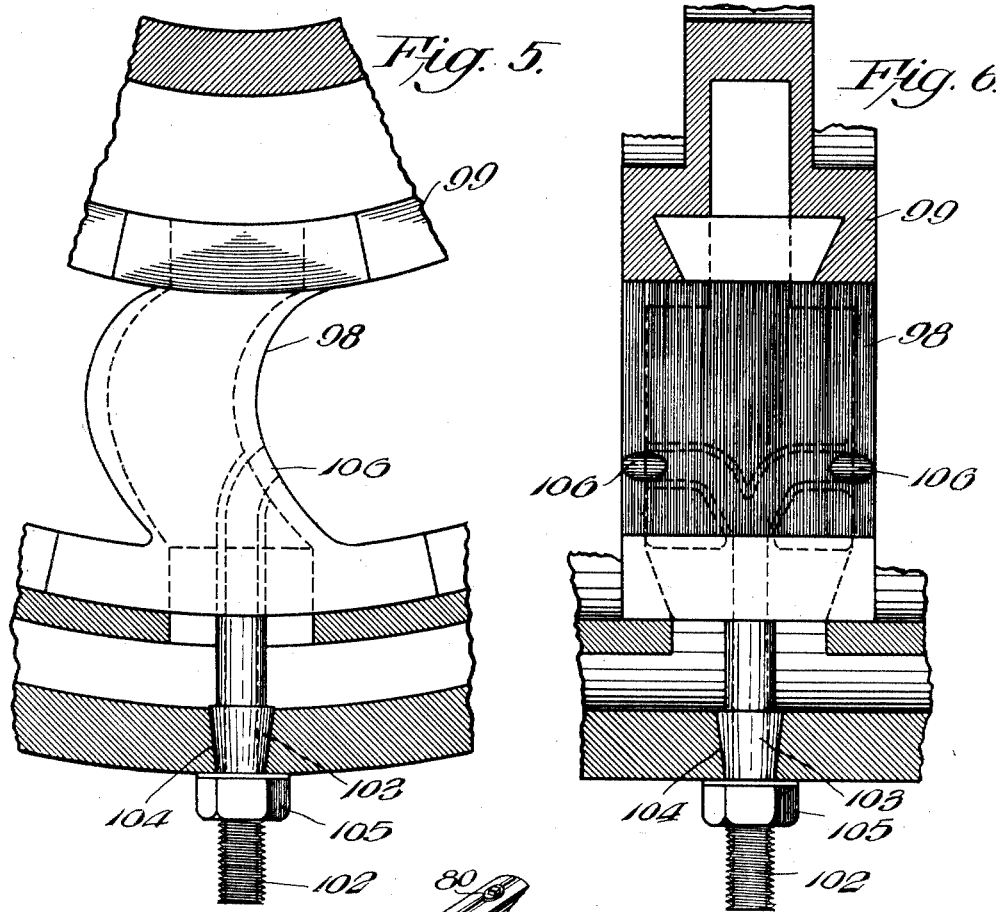
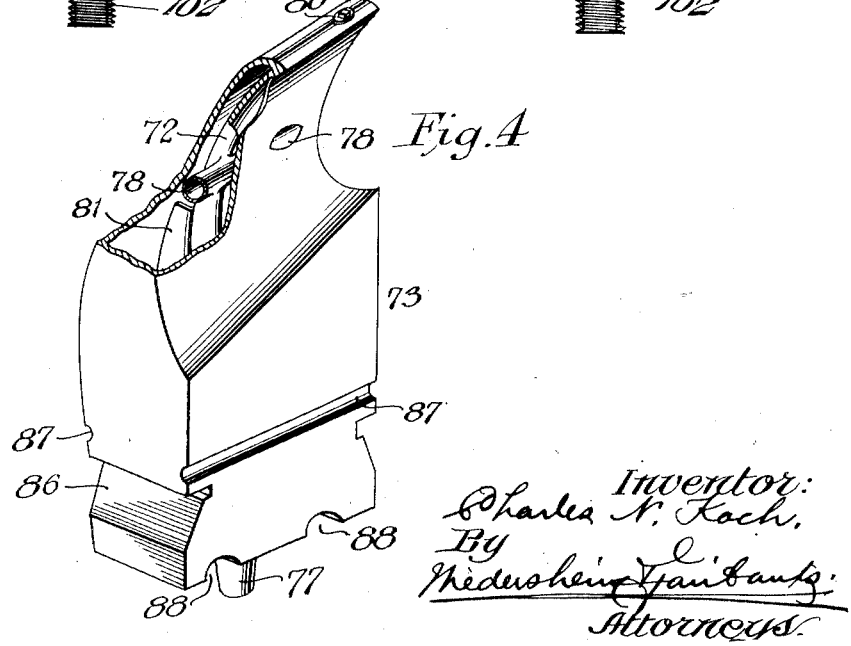

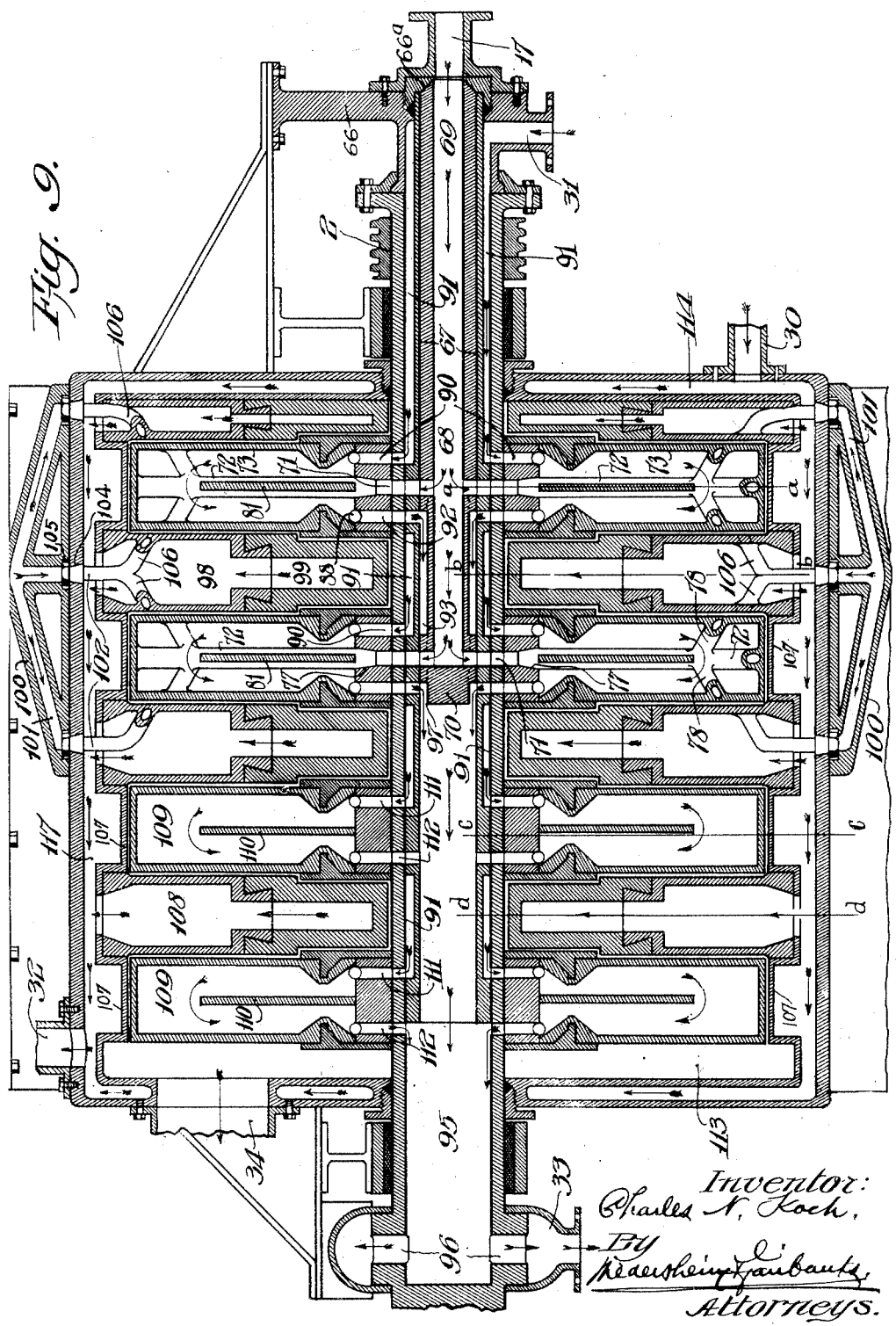

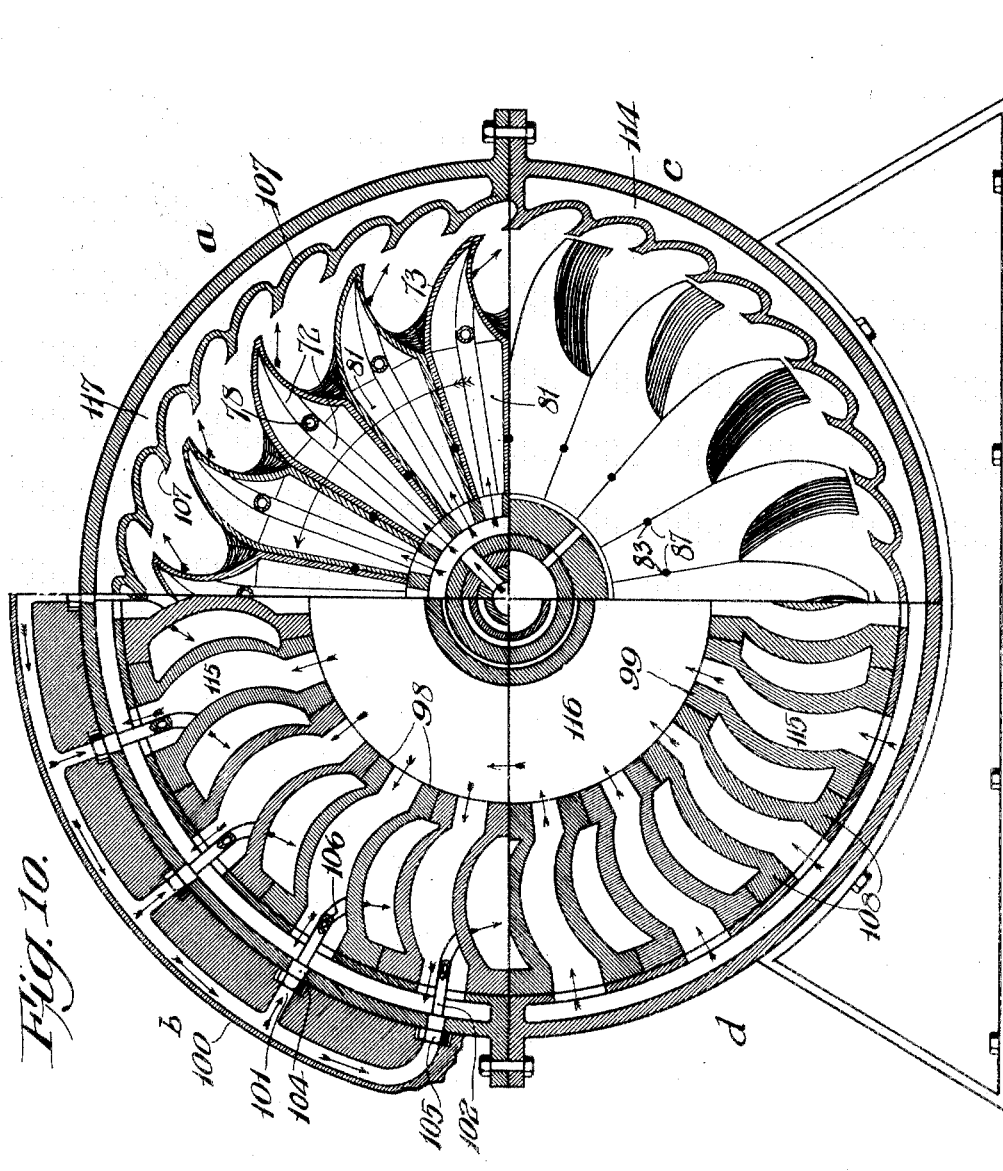

Aug. 6, 1929.  C. N. KOCH  1,723,515
COMBUSTION TURBINE
Filed April 11, 1923  11 Sheets-Sheet 8
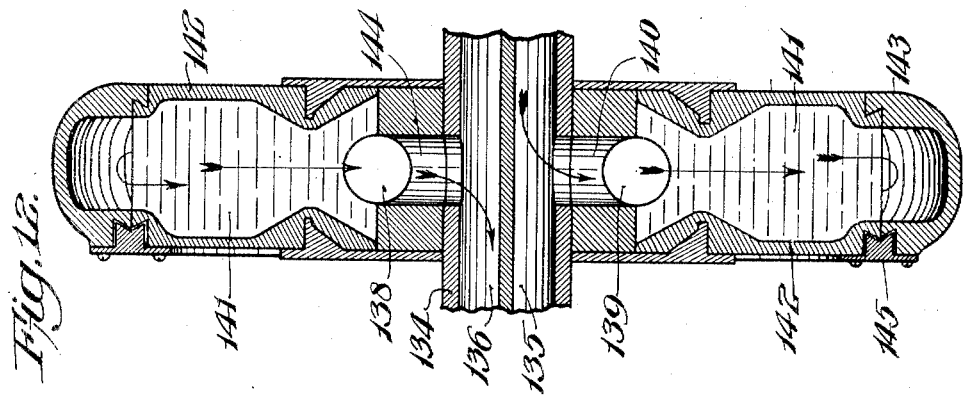
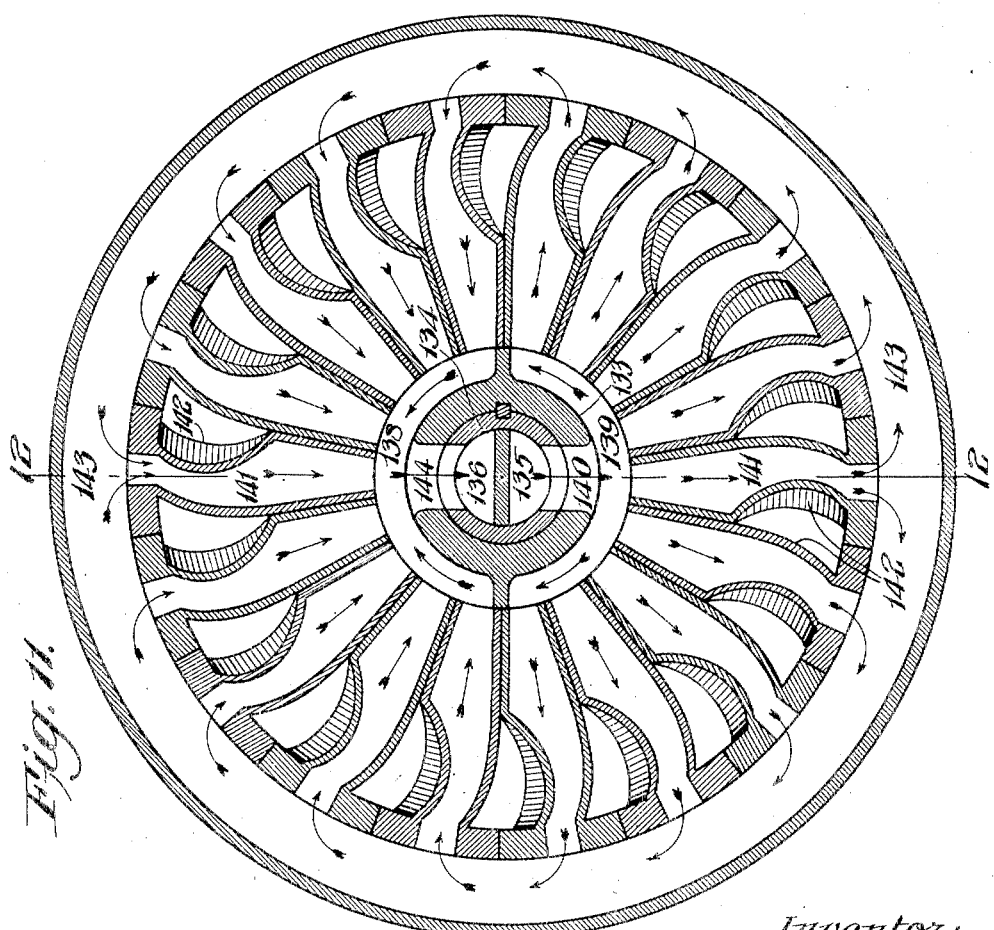

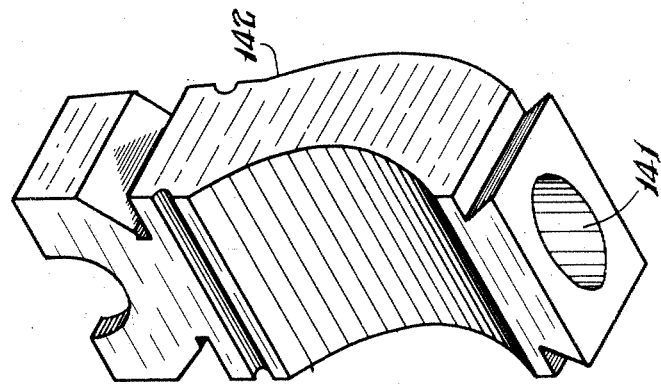
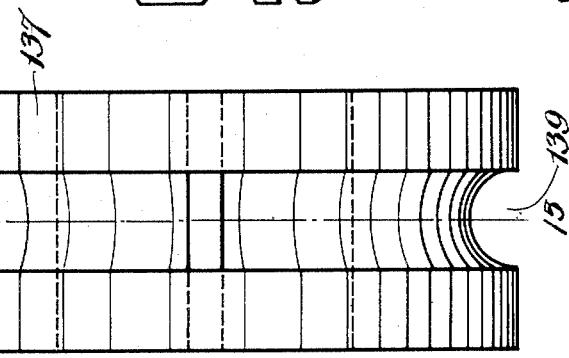
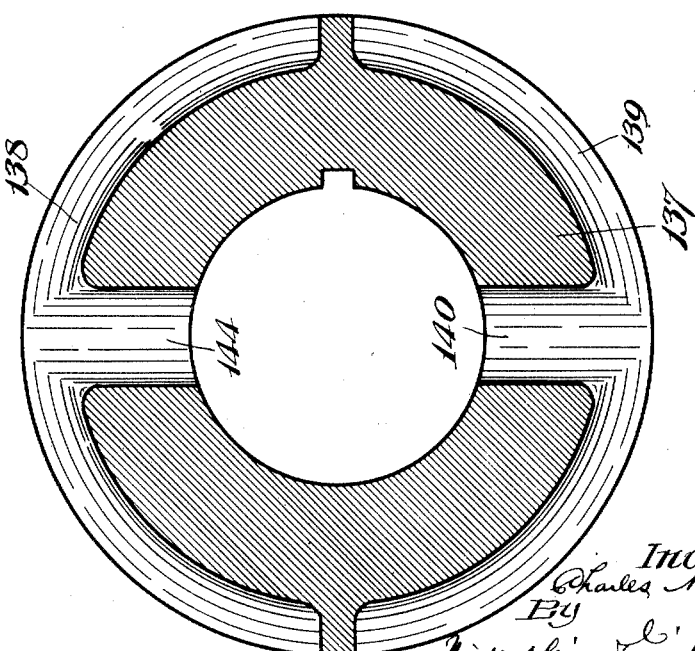

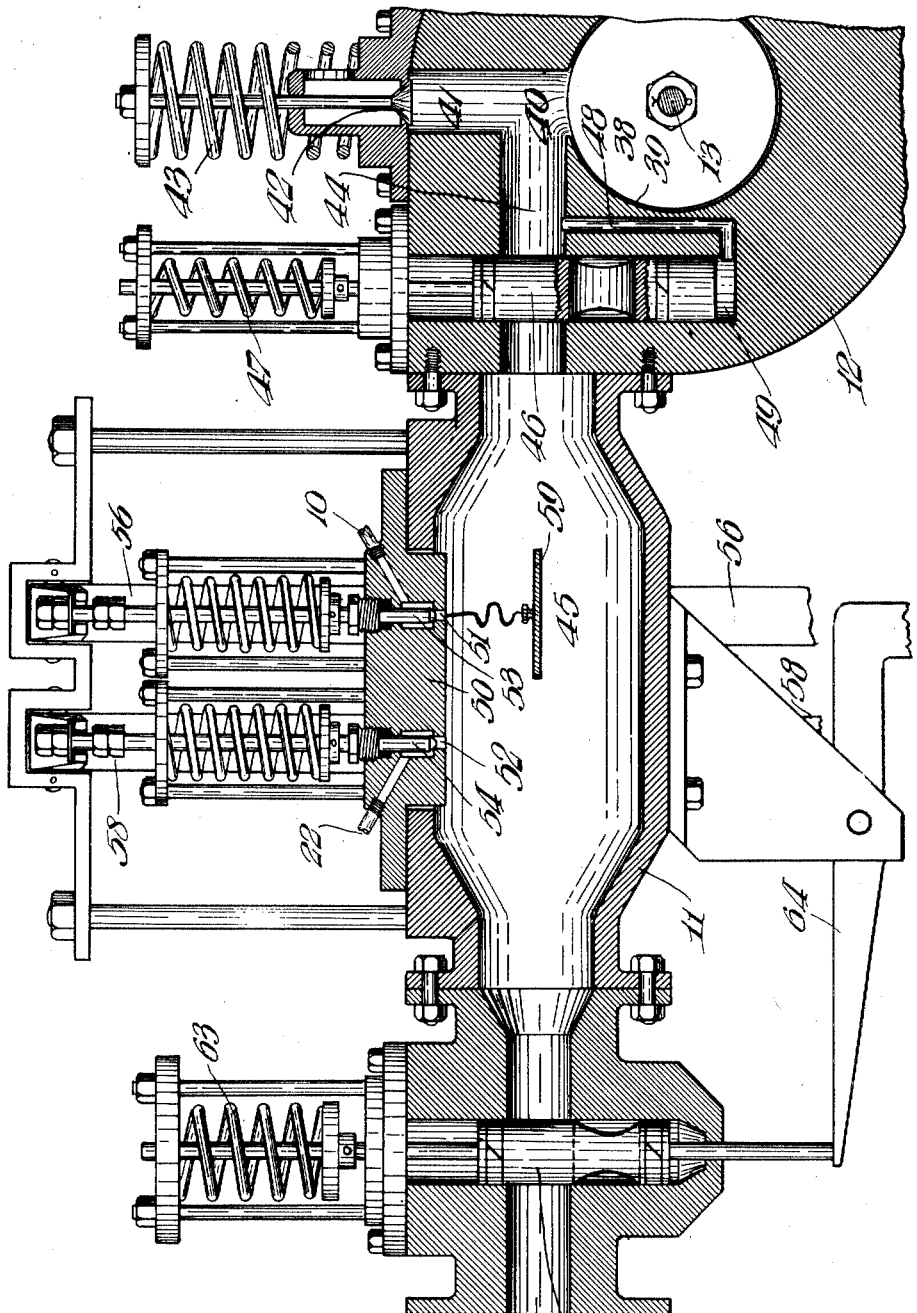

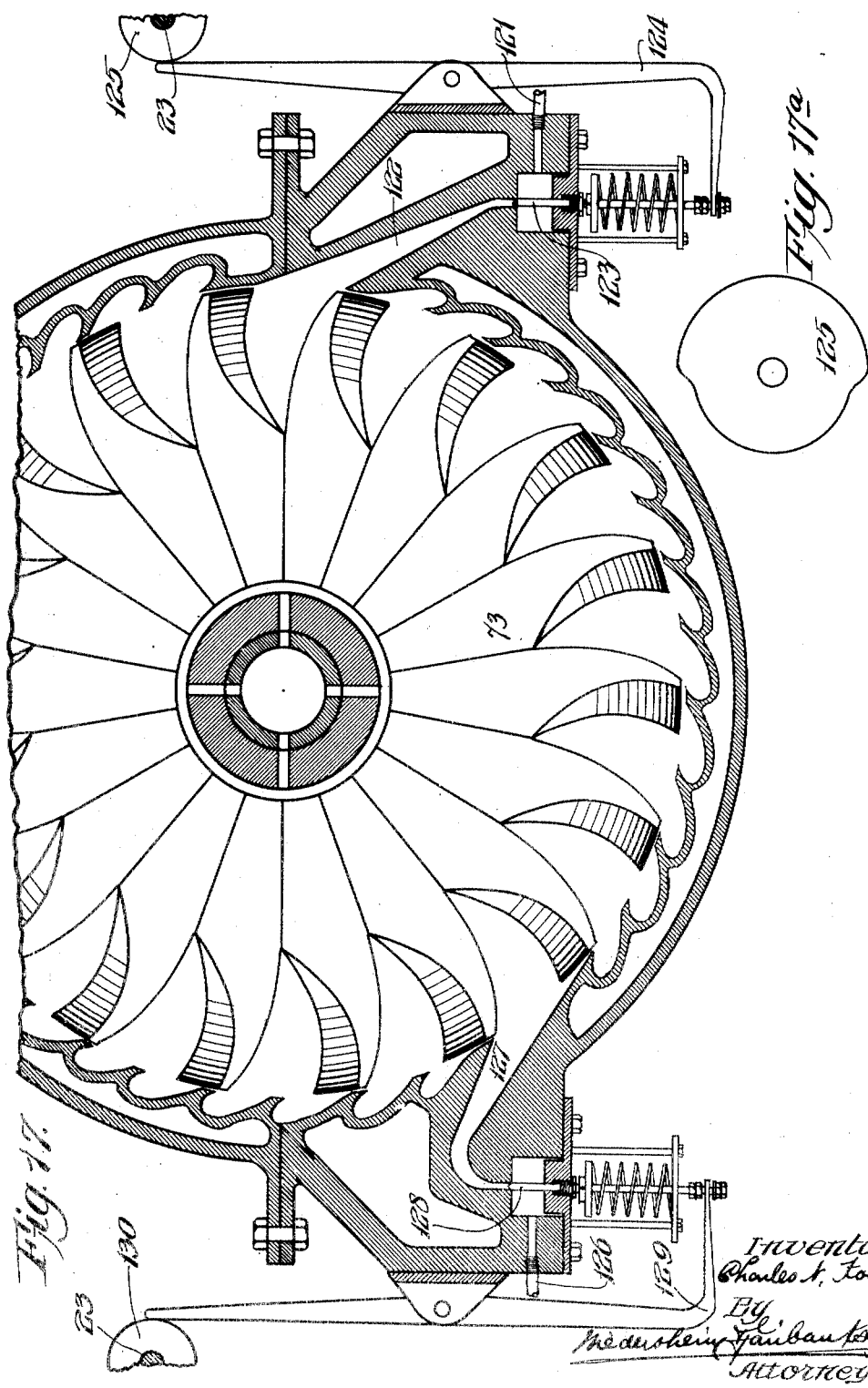

Patented Aug. 6, 1929.

1,723,515

UNITED STATES PATENT OFFICE.

CHARLES N. KOCH, OF KANE, PENNSYLVANIA.

COMBUSTION TURBINE.

Application filed April 11, 1923. Serial No. 631,310.

My present invention comprehends a novel construction and arrangement of a combustion turbine and also includes a novel method of feeding and burning fuel and for cooling the parts with which the motive fluid contacts at very high temperatures.

This invention has many important objects in view, one object being to introduce gases into the turbine casing and against the rotor and stator blades from such points and angles most favorable to the direction of rotation of the rotor, whereby a greater rotative thrust may be obtained on the rotor at the lower rotative speeds and to increase the temperature of the gases in the casing by the friction created by the violent action of the intermingling of the gases upon being introduced into the casing and against the blading from various angles. This violent action also increases burning or consuming of all particles of fuel which may have escaped the initial ignition and to provide a method whereby the fuel converted into gases may be used more economically and expansively and exert all or nearly all of its energy on the rotor blades. The creating of a greater rotative thrust of the rotor at a lower rotative speed will eliminate the use of the reduction mechanism which is commonly used as an intermediate step or connection between a high speed prime mover and the point of utilization of the rotative power. The method of introducing and distributing the gases into the casing also forms a cushion between the periphery of the rotor and the inner circumference of the casing. This has a tendency to float or hold the rotor in suspension during its time of rotation and eliminates vibration, and also wearing of the rotor shaft journal bearings and other moving parts. Crude or refined fuel in any state, or gases in any state may be introduced into and through the ports, channels etc., and ignition and combustion may actually take place in the casing and against the blades.

My invention further comprehends it its broad and generic scope a novel construction and arrangement of a combustion turbine and the component parts thereof; a novel method of introducing the motive fluid and effecting its flow in a novel manner and also novel means for cooling.

It further comprehends a novel construction of a combustion turbine wherein both the motive fluid and cooling medium may be independently introduced through the blading and wherein additional fuel and air can be admitted at any point from the point of ignition to the point of exhaust, so that the volume of gas can be increased throughout different stages of the operation.

Other novel features of construction and advantage too numerous at this point to specifically refer to will hereinafter more fully appear in the detailed description and the appended claims.

For the purpose of illustrating my invention, I have shown in the accompanying drawings embodiments thereof which are at present preferred by me since these embodiments will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents a top plan view of an internal combustion engine, embodying my invention.

Figure 2 represents a front elevation thereof.

Figure 2ª is a sectional view of the conduit for the cooling medium taken on the line 2ª—2ª of Figure 3ª.

Figure 3 represents a side elevation thereof.

Figure 3ª is a perspective view of the conduit for the cooling medium.

Figure 4 represents, in perspective and in detached position, and on an enlarged scale, a rotor blade employed.

Figure 5 represents, in side elevation, a fuel stator blade with a portion of the casing and shrouding.

Figure 6 represents, in front elevation, the construction seen in Figure 5.

Figure 7 represents, in side elevation, the hub flange with its bolts in place and a basal portion of a rotor blade.

Figure 8 represents a section on line 18—18 of Figure 7.

Figure 9 represents a longitudinal section through the assembled turbine.

Figure 10 represents an irregular cross section of the engine showing four different sections on the longitudinal axis located as indicated by the section lines a, b, c, d, of Figure 9 which are to be associated with the correspondingly lettered quadrants of Figure 10.

Figure 11 represents another embodiment of my invention showing a transverse section of the construction and a different form of cooling system.

Figure 12 represents a section on line 12—12 of Figure 11.

Figure 13 represents, in perspective, a rotor blade employed in the construction shown in Figures 11 and 12.

Figure 14 represents a front elevation of the hub, used with the blades seen in Figure 13.

Figure 15 represents a section on line 15—15 of Figure 14.

Figure 16 represents, in sectional elevation, the combustion pot, air compressor and valve.

Figure 17 represents a horizontal section through the casing and the first and second stage blading, certain of the parts being cut away for the sake of clearness of illustration.

Figure 17a represents, in front elevation, the cam seen in Figure 17.

Similar numerals of reference indicate corresponding parts.

Referring to the drawings—

For the purpose of illustration, I have preferred to show my invention as embodied in a combustion engine of the turbine type although it is not limited to a turbine construction.

In order that the general construction and operation and cycle employed can be readily comprehended, I will first give a general description of the construction and method. The construction employed and by means of which the method can be carried out includes a hollow rotor shaft, supported in bearings revolving in a casing in which stator blades are mounted and surrounded by any number of rotor blades hereinafter described. These rotor blades receive their impulse from motive fluid, the course and flow of which will be hereinafter described, which may be formed by igniting the proper mixture of fuel and air in a number of hereinafter described combustion pots. The use of this type of combustive pot is not compulsory, however, as the mixture of fuel and air can be ignited by any approved means at any point between the air and fuel valve on the combustion pot and the exhaust orifice in the casing. Additional fuel and air may be introduced at any point between the point of ignition and the exhaust orifice in the turbine thereby increasing the volume and pressure of the incandescent gases. The highly compressed and therefore highly heated air may be introduced into the casing and the fuel may be sprayed or blown into the path of this highly heated air which may be heated by compression or by mechanical or electrical means in the combustion pot and ignited directly in the casing thereby avoiding the loss of heat to the point of utilization against the rotor and stator blades.

The path and course of the gases are as follows:—From the point of ignition through the gas conduit in the shaft the gases emerge from the nozzles in the gas rotor blades and intermingle with the gas emerging from the nozzles of the gas stator blades, the two streams of gases combining their effect on the operating surface of each rotor blade. The gases then are deflected from the annular buckets in the inner circumference of the casing causing them to act upon the deflecting surface of the rotor and stator blades and emerging from the nozzle or first stage series of blades to act upon the expansion or second stage or low pressure series of rotor and stator blades with a direction of flow parallel to the axis of the rotor, thence, when their energy is nearly exhausted, to be discharged from the casing through the exhaust orifice. The direction of motive fluid emitted by the rotor nozzles is represented by arrows in the upper right-hand quadrant of Fig. 10. Due to the reflecting properties of buckets 107, the fluid is redirected back to the rotor and adds its kinetic energy to that of the fluid emerging from the stator.

In the past, it has been the practice of engineers to keep the temperature of the gases as low as possible due to the fact that the intense heat of the gases caused rapid deterioration of the blades of the turbine, but, with my method of cooling the rotor and stator blades, it is my object to obtain the greatest heat possible from the gases, thereby converting more of the energy of the fuel into useful work and also preventing waste of fuel by thorough consumption of all fuel used. Due to the method of forming and igniting the charge, I obtain a constant flow of gases to the point of utilization, thereby eliminating the intermittent impulses caused by a series of explosions.

The general arrangement of the engine and its auxiliary is best seen in Figure 1, to which attention is now directed and also to Figures 2 and 3.

1 designates the turbine casing in which is rotatably mounted the rotor shaft 2 which is driven by the turbine. The rotor shaft, as illustrated, is intergeared with the jack shaft 3 by means of which, as illustrated, all of the auxiliaries are driven. The connections are such that the auxiliaries are driven at a desired speed which in practice is much less than that of the speed of the rotor shaft. 4 designates a conduit leading from a source of fuel supply, and a fuel pump 5 is provided, the operating shaft of which is intergeared with the jack shaft 3. The by-pass 6 is provided having a release valve 7 in its line. The fuel line 8 leads from the fuel pump 5 and communicates by branch pipes with the throttle valves 9.

The fuel feed lines 10 lead from their respective throttle valves 9 to their combustion pots 11. It will be seen that four combustion pots are provided, arranged in pairs on opposite sides of the casing. 12 designates the air compressors, the piston rods 13 of which are connected by the connecting rods 14 and crank arms 15 with the jack shaft 3. The connections from the piston rods 13 to the jack shaft are so arranged that the discharge from the compressors to the combustion pots 11 takes place alternately through the connections 16. The two front combustion pots 11 discharge through their respective conduits 17 into the rotor shaft 2. The two rear combustion pots 11 discharge through the conduits 18 into the intake manifold for the casing nozzles. An auxiliary air compressor 19 is provided which is operatively connected with the jack shaft 3, as illustrated, to be driven by it, and a conduit 20 leads from this auxiliary air compressor 19 to the accumulator 21 from which leads a conduit 22 which communicates with each combustion pot 11.

23 designates timing shafts which are intergeared with the jack shaft 3 to be driven thereby. Each timing shaft drives a double faced cam 24 which controls the admission of air and fuel to the combustion pots 11 as will be hereinafter more fully explained.

25 designates a forced feed lubricating pump which leads by a line 26 to the various bearing parts in any desired manner. 27 designates a conduit communicating with a source of supply of cooling medium and leading to a pump 28 which is driven from the jackshaft 3 in any desired manner and a conduit 29 leads from the pump 28 which discharges by a branch conduit 30 to the turbine casing and by the branch conduit 31 to the hollow rotor shaft and therefrom, as will be hereinafter explained.

The discharge from the casing of the cooling medium takes place through the conduit 32 which leads to the source of supply of such cooling medium. The discharge from the rotor shaft of the cooling medium takes place through the conduit 33 which leads to the source of supply of such cooling medium. The discharge of the exhaust gases takes place through the conduit 34 which is provided with an exhaust pump 35. The conduits 17 are provided with the nonreturn valves 36. The accumulator 21 is provided with a relief valve 37.

Referring now to Figure 16, this section is taken substantially on line 16—16 of Figure 1. The air compressor 12 is shown as having a piston 38 and a piston chamber 39 from which leads a passage 40 which communicates with an inlet passage 41 which is controlled by a suction valve 42, which is held to its seat by a spring 43. The passage 40 communicates by means of the passage 44 with the chamber 45 of a combustion pot 11, and the passage of air to the combustion pot is controlled by means of a valve 46 of the balanced type having a spring 47 which tends to close it, and a bypass 48 is provided leading to the bottom of the valve chamber 49, so that, due to the pressure created by the piston 38, the valve will be opened to permit the compressed air to pass into the chamber 45 of the combustion pot. Each combustion pot 11 is provided with a bonnet 50 having a passage 51 communicating with the fuel conduit 10 and an air passage 52 communicating with the air conduit 22 leading from the accumulator 21. A passage 51 is controlled by a spring actuated valve 53, and the passage 52 is controlled by a spring actuated valve 54. The springs tend to maintain said valves in their closed position and they are opened by the double faced cams 24 at a predetermined time. One face of a cam 24, for example, the cam face 55, see Figure 1, actuates the levers 56 and 58 to open the valves 53 and 54 of one combustion pot, 11, and, in a similar manner, the other face 57 of the same cam 24 actuates the lever 56 and 58 of the adjacent combustion pot, 11, see Figures 1, 3 and 16.

59 designates an electrically or otherwise heated plate which is disposed within the chamber 45 and is electrically connected with the posts 60, see Fig. 1, which in turn are connected with a source of electric supply.

The discharge from a combustion pot chamber 45 through its discharge passage 61 is controlled by a valve 62 which is moved in its closing direction by means of a spring 63, and its opening is effected by means of a lever 64, which is controlled by a cam 65 on the timing shaft 23, see Figure 2. It will be understood that each combustion pot 11 co-operates with its compressor, and the discharge from the combustion pot is controlled in each case in a similar manner.

Referring now more particularly to Figures 2$^a$, 3$^a$, 9 and 10, it will be seen that the rotor shaft 2 is hollow and has a swivelled joint 66$^a$ on a stationary bracket 66. Contained within this shaft at one end is a tubular sleeve 67 having the fluted hubs 68 and within this sleeve 67 is a motive fluid sleeve 69 which is closed at its far end, as at 70, and which communicates at its other end with the motive fluid inlet conduit 17 through which the motive fluid is introduced from a combustion pot.

The motive fluid passes from the sleeve 69 through the passages 71 into the motive fluid pipes 72 which are disposed within the rotor blades 73 of the first stage, see more particularly Figures 4, 9 and 10. The rotor blades 73 are clamped to a hub 74, see Fig. 8, which is provided with a key-way 75, whereby such hubs are keyed to the shaft 2. The hubs 74 communicate with the passages 71 and form a part thereof and are provided with the tapered seats 76 into which are fitted the conical or tapered inner ends of the motive fluid pipes or nozzles 72, as shown at 77. These motive fluid pipes 72 are provided with the lateral branches 78, see Fig. 4, which open through the working face of a rotor blade 73 at a plurality of points, one of which is preferably near the outer periphery of the blade. The rotor blades are provided with cleaning openings which are normally closed by the plugs 80. The motive fluid pipes 72 are connected, as illustrated, with a diaphragm 81 which forms a baffle for the cooling medium and extends from the base of a blade and terminates a desired distance below its tip. The rotor blades are also reinforced when the diaphragms are used. The rotor blades are preferably made by a stamping, forging or casting operation and may be made in sections and welded together. The rotor blades of the first stage are mounted on the hubs 74, see Figures 7 and 8, and secured in position by clamping rings 82 and fastening devices 83. The rings 82 have side lugs 84 from which extend inwardly the inclined walls 85 to engage the walls of the recesses 86 in the rotor blades, so that when they are being assembled there will be a drawing action to form a fluid tight joint with the hub. At the same time the tapered end 77 or terminal of the motive fluid pipe 72 forms a fluid tight joint with the walls of its recess 76. The base of a rotor blade has a groove 87, see Fig. 4, which forms an aperture to receive a fastening device 83, see Figures 7 and 8. The rotor blades 73 have the grooves 88, see Figure 4, which associate with the annular grooves 89, see Fig. 8, to form passages for the cooling medium. The groove 89 at one side of a blade communicates by inlet ports 90 with the passage 91 which communicates with the cooling conduit 31, see Figure 9. The groove 89 at the opposite side of a blade communicates by ports 92 with a passage 93 which leads to the passage formed by the flutes 94, see Figure 3ª, to the discharge passage 95 leading to the leak off ports 96 which communicate with the leak off receptacles 33, see Figure 9 and also Figure 1. The cooling medium for the second wheel of the first stage passes to its rotor blades through ports 90 and discharges through ports 97 to discharge passage 95, see Figure 9. The motive fluid passes to the second wheel of the first stage rotor blades through its inlet ports 71.

The stator blades for the first stage are best seen in Figures 5, 6 and 9 from which it will be seen that the stator blades 98 are keyed to the turbine casing and to the shrouding 99. The conduits 18 lead to a common manifold 100, see Figures 1 and 9, having passages 101 leading to the stator motive fluid pipes 102 which have tapered collars 103 which are drawn into fluid tight engagement with their seats 104 by nuts 105, see Figures 5 and 6. This also forms a fluid tight joint between the basal portion of the blade and the casing. The motive fluid pipes 102 preferably terminate in branch nozzles 106 opening through the front face of the blades, preferably in proximity to the tip of a juxtaposed rotor blade and adjacent to the discharge points of the branch nozzles 78, if such are employed.

In the stator blading of the first stage the first and last stator blades have but one nozzle 106. The stator blades may be cast, stamped or forged in sections and welded together. The inner periphery of the turbine casing is provided with buckets 107 which curve forwardly in the direction of rotation of the rotor and then rearwardly, see Figure 10.

The stator blades 108 of the second and succeeding stages are similar to those of the first stage except the motive fluid admission pipes are not employed, see Figures 9 and 10. The same holds true of the rotor blades 109. A diaphragm 110 is employed. The cooling medium enters through ports 111 and discharges through ports 112 to the discharge passage 95. The working face of a rotor blade 109 is of such curvature as to utilize as much as possible of the energy of the gases during their course of deflection from the stator blading. The motive fluid, now in gaseous form, flows axially in the usual manner across alternate rotor and stator blading until it reaches the exhaust space 113 which communicates with exhaust conduit 34, see Figures 9 and 1. The cooling medium for all of the stator blading enters through conduit 30 into the water jacket chamber 114, see Figures 9 and 10, and passes upwardly through the cooling passages 115 of the stator blading or blades into the chamber 116 of the stator shrouding, and from such chamber through passages 115 in the upper half of the stator blades into the chamber 117 and to the discharge conduit 32. This circulation is increased due to thermosyphonic action.

In Figures 11 to 15 inclusive, the cooling of the rotor blades is effected by a different form of my invention. The rotor shaft 134 is partitioned to form an inlet 135 and outlet 136 for the cooling medium. The rotor hub 137 is keyed to the shaft 134. The rotor hub is provided with an upper semicircular groove 138 partitioned from a lower semicircular groove 139. The inlet 135 communicates by a port 140 with the groove 139 which communicates with the chambers 141 of the rotor blades 142, of the lower half, said chambers 141 discharging into the chamber of shrouding 143. The cooling medium then passes through the chambers 141 of the upper half of rotor blades 142 and through groove 138 and port 144 to discharge outlet 136. The blades are secured to their hub in the same manner as described with other figures of the drawings, and the shrouding is secured to the blades by clamping rings 145, and suitable fastening devices. The outer end of a blade 142 is constructed to form a dove-tail joint with the housing and also at its basal portion with its clamping rings which secure it to its hub.

The operation will now be readily apparent to those skilled in this art and is as follows:—

It is within the scope of my present invention to carry out the cycle of the operation in several different ways, for example, the fuel can be introduced with the air into the combustion pot and ignited in the combustion pot. The ignition of the fuel in the combustion pot may be effected entirely by the heat of compression or a hot plate may be employed which is electrically or otherwise heated and this hot plate may be employed continuously or only for the preliminary ignition, since after the engine is running at normal temperature, the source of heat for the hot plate can be cut off and the fuel will be ignited solely by the heat of compression in the combustion pot.

I have preferred to illustrate the introduction of the motive fluid as taking place either through the rotor or stator blading or both or through a series of spaced nozzles, it being apparent that in the broad and generic scope of my invention any of these methods of fuel introduction can be employed.

Any grade of crude or refined hydrocarbon can be used as a fuel as well as any ignitable gas. The fuel is fed from its source of supply by means of a fuel pump and assuming that the combustion pots are to be used, the fuel passes from the main fuel feed line 4 through the lines 8 to the throttle valves 9 which communicate by means of branch pipes 10, see Figure 1, with the valve controlled passage 51, which controls the introduction of the fuel into the chamber 45 of a combustion pot 11. The valve 53 is actuated in its opening direction by a lever 56 which is controlled as before explained by a cam on the timing shaft 23. The compressed air is taken into the compressor through the port 41 and when compressed by a piston 38 passes through the by-pass 48 to effect the opening of the valve 46 so that the air under pressure passes through the passage 44 into the combustion chamber 45. At the beginning of the operation, the hot plate 59 may be utilized, which, as illustrated, is electrically heated. After the engine is running normally, the electric circuit for this hot plate 59 can be opened. In order to prolong the blast in the combustion pot chamber 45, I provide means for admitting additional compressed air from the accumulator 21 which is charged by means of the auxiliary air compressor 19. The additional compressed air passing by means of the conduit 22, see Figures 1 and 16 to the combustion pot chamber 45 and its introduction is controlled by means of the valve 54 which is moved in its opening direction by means of a lever 58 similar to the lever 56.

The levers 56 and 58 are actuated by the cam 24 carried by a timing shaft 23. The motive fluid passes from the combustion pot through the passage 61 when the valve 62 is opened by means of its lever 64 actuated by the cam 65 on the timing shaft 23.

Each of the combustion pots operate in a similar manner so that the description of one will suffice for all. Two of the combustion pots discharge through the conduits 17 to the rotor shaft 2, see more particularly Figures 1, 2, 3 and 9. The motive fluid passes into the motive fluid sleeve 69 and therefrom through the passages 71 into the motive fluid sleeve 72, see more particularly Figures 4 and 9, and Figures 7 and 8. The motive fluid discharges after passing through the rotor blades through the working face thereof in a direction opposite to the direction of rotation of such blades and if the side branches 78 are provided, their discharge takes place in addition to the discharge at the tip of the blade at spaced points through the working face of the blade intermediate the tip and base of its working portion. This discharge is continuous and not intermittent.

Two of the combustion pots 11 discharge through the conduit 18 into the manifold, furnishing motive fluid for the intake nozzles which discharge into the motive fluid pipe 102. This pipe may or may not be branched as at 106. It will thus be seen that the motive fluid from the stator blades is discharged therefrom in the same direction as the direction of rotation of the rotor blading.

The gases pass from the rotor and stator blades of the different stages to the chamber 113 and therefrom through the exhaust conduit 34 such exhaust being facilitated by the exhaust pump 35.

If desired, at any point between the ignition and exhaust of the gases, additional fuel or air at any stage or between any stage may be introduced, and if desired both fuel and air may be introduced, see more particularly Figure 17, from which it will be seen that the motive fluid line 121 leading from the motive fluid line 8 leads to the discharge passage or nozzle 122 which communicates with the combustion space. The introduction of motive fluid in this manner is controlled by a cam 125 on a timing shaft 23 said cam controlling a lever 124 which effects the opening of the valve 123, see Figure 17.

A line 126 leads from the air line 22 connected with the accumulator 21 and discharges through the passage or nozzle 127 such discharge being controlled by a valve 128 which is opened by the lever 129 and by the cam 130 on the timing shaft 23.

Referring now to Figure 10, it will be seen that the motive fluid discharging from the straight branch of a pipe 72 to a rotor blade is directed by the end of the tube towards a bucket 107 on the inner periphery of the turbine casing, and, owing to the reverse curvature of such bucket, the gases are redirected against the working face of a rotor blade so that a reactionary impulse is imparted to such rotary blade.

It will be apparent that the same action to a certain extent is obtained with the rotor blades of the second and succeeding stages and the buckets 107. It will be understood that the gases flow through the turbine in a direction parallel with the rotor shaft. The working faces of the rotor blades are curved so as to give a deflecting action in this direction. The same holds true of the stator blades.

It is necessary in a turbine or rotary engine operating under high temperatures to provide means to prevent the destruction of the metal under destructive temperatures, and, for this purpose, I provide means for circulating a cooling medium through both the rotor and the stator blading. The cooling medium comes from a source of supply through the conduit 27 and passes through the branch conduit 31 to the rotor shaft and through the branch conduit 30 to the turbine casing, see Figures 1 and 9, see also Figures 5, 6 and 10. The cooling medium passes into the chamber 114 and through the stator blades in the lower half of the housing in the direction of the arrows seen in Figures 9 and 10 through the passages 115 and into the chamber 116 of the inner shrouding and therefrom through the passages 115 in the upper stator blades to the chamber 117, the discharge taking place through conduit 32 to the source of supply of the cooling medium.

In this manner the stator blades are kept below destructive temperatures. The circulation takes place under thermosyphonic action in both the stator and rotor blading.

Taking up now the cooling of the rotor blading, the cooling medium is pumped from the source of supply through the conduit 31 into the annular chamber 91 formed between the rotor shaft and the tube 67. Due to the flutes on the collar 68 a source of supply of cooling medium is maintained between the sleeve 67 and the rotor shaft 2 throughout the length of such sleeve. The cooling medium passes through the ports 90 into the internal chamber of a rotor blade toward the tip of the blade and over the diaphragm 81 thence through the ports 92 into the passages 93 and due to the provision of the flutes or recesses 94, the discharge of cooling water passes into the discharge passage 95 through ports 96 into the leakoff receptacle 33 and therefrom to the source of supply of the cooling medium. The cooling medium for the second rotor wheel of the first stage passes through the ports 90, circulates through the rotor blades and discharges through the ports 97 into the discharge passage 95. In a similar manner in the rotor blades of the second set, the cooling medium passes from the passage 91 through the ports 111 around the diaphragm 110 and discharges through the ports 112 into the discharge passage 95. The baffle or partition in the rotor blades may be arranged in many different ways, for example, so as to form side cooling chambers as seen in Figure 4.

In some cases, it is advantageous to have the cooling medium pass through the rotor blades into an outer shrouding 143, see Figure 11, so that the cooling medium passes directly through the rotor blades in an unobstructed channel, which eliminates the necessity of small ports and recesses.

In the embodiments seen in Figures 11 and 12, the rotor shaft is divided by a partition to provide an inlet and outlet passage for the cooling medium.

If the baffle or diaphragm in the rotor blades is disposed laterally a better cooling action of the front face of the blading is obtained than if the baffles are disposed, as seen in Figure 4, for example, but a better reinforcement is obtained to a certain extent if the baffle or diaphragm is disposed, as seen in Figure 4.

I obtain a continuous rotative thrust on all of the rotor blading of the first stage irrespective of the position of the rotor wheels in the casing.

It will now be apparent that I have devised a new and useful combustion engine and method of operating it, which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages within the scope of the claims.

Having thus described my invention, what I claim as new and desire to secure by Letters Patent, is:

1. In a combustion turbine, a hollow rotor shaft, the hollow interior of which is divided into two separate longitudinal spaces, an inlet for the motive fluid of the turbine connected with one of said spaces and an inlet for the cooling medium of said turbine connected with the other of said spaces, an outlet for the said motive fluid connected with the first of said spaces, and an outlet for the said cooling medium connected with the second of said spaces.

2. In a combustion turbine, a hollow rotor shaft, the hollow interior of which is divided into two separate longitudinal spaces, an inlet for the motive fluid of the turbine connected with one of said spaces and an inlet for the cooling medium of said turbine connected with the other of said spaces, a hub member upon said shaft, an outlet for the said motive fluid consisting of a plurality of substantially radial passages in said hub member communicating with one of said spaces in the shaft, an outlet for said cooling medium consisting of a plurality of substantially radial passages in said hub member independent of the first mentioned radial passages and communicating with the other of said spaces in the shaft.

3. A turbine rotor blade having in its basal portion an inlet for the motive fluid of the turbine, a conduit extending in a substantially radial direction through said rotor blade, said conduit communicating with the said inlet at one of its ends and terminating at its other end in an orifice in the working face of said rotor blade.

4. A turbine rotor blade having in its basal portion an inlet for the motive fluid of the turbine, a conduit extending in a substantially radial direction through said rotor blade, said conduit communicating with the said inlet at one of its ends and terminating at its other end in a plurality of orifices in the working face of said rotor blade.

5. A hollow turbine rotor blade having at its basal portion an inlet for the motive fluid of the turbine, an inlet for the cooling medium of the turbine and an outlet for the cooling medium of the turbine, a conduit extending in a substantially radial direction within the hollow interior of said blade and communicating at one of its ends with the said inlet for the said motive fluid and terminating at its other end in an orifice in the working face of the blade, a chamber extending in a substantially radial direction throughout the blade and communicating with the said inlet for the cooling medium at one of its ends and at its other end communicating with a second substantially radial chamber, said second chamber communicating at its basal end with the said outlet for the cooling medium.

6. A turbine stator blade secured to the inner surface of the turbine casing at one of its ends and having at that end a connection for the motive fluid of the turbine, a conduit extending in a substantially radial direction within said blade, said conduit being connected at one of its ends with said inlet for the motive fluid and terminating at its other end in an orifice in the working face of the blade.

7. A turbine stator blade secured to the inner surface of the turbine casing at one of its ends and having at that end a connection for the motive fluid of the turbine, a conduit extending in a substantially radial direction within said blade, said conduit being connected at one of its ends with said inlet for the motive fluid and terminating at its other end in a plurality of orifices in the working face of the blade.

8. A hollow turbine blade, means for securing said blade to the inner surface of the turbine casing, an inlet for the motive fluid of the turbine in the end of said stator blade adjacent to the turbine stator casing, an inlet for the cooling medium of said turbine in the end of said stator blade adjacent to said casing, a conduit extending in a substantially radial direction through said stator blade communicating at one of its ends with said inlet for the motive fluid and terminating at its other end in an orifice in the working face of said stator blade, a chamber extending in a substantially radial direction throughout said blade communicating at one of its ends with the said inlet for the cooling medium and communicating at its other end with an annular passage in the shrouding of said stator blade, said annular passage in the shrouding being in communication with the outlet for said cooling medium.

9. In a combustion turbine, a hollow shaft, the hollow interior of which is divided into two separate longitudinal spaces, an inlet for the cooling medium of said turbine connected with one of said spaces, an outlet for the cooling medium of said turbine connected with the other of said spaces, a hub member upon said shaft, a radial passage in said hub member communicating with the first mentioned of said spaces, a separate radial passage in said hub member communicating with the second mentioned of said spaces, an annular chamber in said hub member communicating with the first mentioned radial passage, a separate annular chamber in said hub member communicating with the second mentioned radial passage, a plurality of hollow rotor blades secured to said hub member, the outer portion of said blades being secured by a shrouding, said shrouding containing an annular passage extending throughout the entire circumference of the rotor, a chamber extending through each of said rotor blades communicating at one end with the said annular passage in the shrouding and communicating at its other end with one of the said annular chambers in the hub.

10. In a combustion turbine, a turbine casing containing on its inner surface a plurality of buckets annularly spaced around the casing, a plurality of rotor blades each having a working surface, means to introduce motive fluid into the turbine casing through the working surface of the rotor blades in such a direction that said motive fluid impinges upon said buckets and is thereby redirected against the working surface of the blade.

11. In a combustion turbine, a plurality of rotor blades in combination with a plurality of stator blades, means for introducing the motive fluid of the turbine through the working surface of the rotor blades and means for introducing the motive fluid through the working surface of the stator blades, said first mentioned means being so positioned with respect to said second mentioned means as to cause the motive fluid issuing from the rotor blades to thoroughly commingle with the motive fluid issuing from the stator blades.

CHARLES N. KOCH.